June 18, 1946.    T. A. ANDERER ET AL    2,402,142
TANDEM SELF ALIGNING GAUGE
Filed Jan. 27, 1945

Inventors
THEODORE A. ANDERER
ROBERT W. TAFEL
By C.E. Herrstrom & W.E. Thibodeau
Attorneys

UNITED STATES PATENT OFFICE 2,402,142

TANDEM SELF-ALIGNING GAUGE

Theodore A. Anderer, Philadelphia, and Robert W. Tafel, Drexel Hill, Pa.

Application January 27, 1945, Serial No. 574,936

3 Claims. (Cl. 33—178)

(Granted under the act of March 3, 1883, as amended April 30, 1928; 370 O. G. 757)

The invention described herein may be manufactured and used by or for the Government for governmental purposes without the payment to us of any royalty thereon.

Our invention relates to gages used in measuring the conformity of cylindrical and other objects to pre-determined ranges of diametrical dimension.

Broadly stated, the object of our invention is to improve the performance and simplify the operation of gages useful in checking the external diameter of cylinders or the corresponding dimension of other specimens.

A more specific object is to reduce the number of operations heretofore considered most practical for gaging the overall dimensions of cylindrical and other specimens.

Another object is to provide improved means for positive selection of specimens which are within acceptable external dimensional limits.

A further object is to reduce the time required to check external dimensions of specimens over gaging methods previously used.

A still further object is to obviate all need for rechecking the gage element's precision after assembly into the gage-holder.

An additional object is to improve the economy of gage operation and increase the life of gage ring elements.

Figure 1:
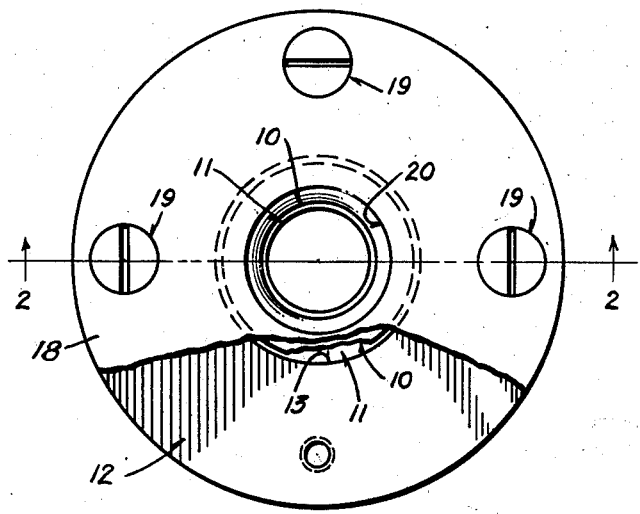
Figure 2:
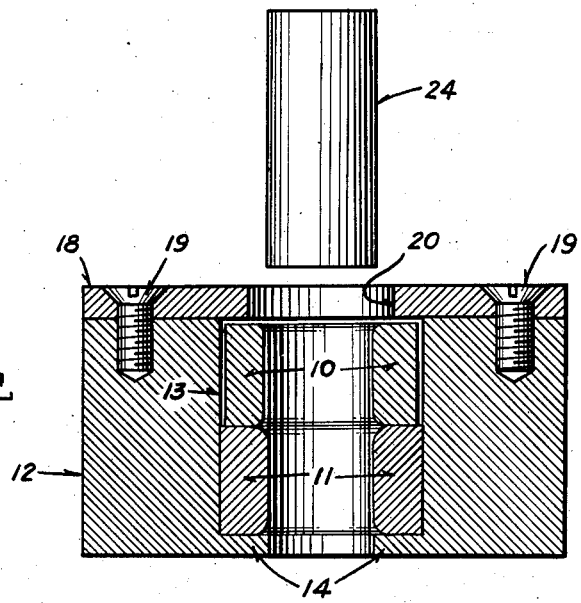

One preferred form of our improved external dimension gage is shown by the accompanying drawing wherein:

Fig. 1 is a top plan view of our improved gage assembly with certain portions thereof partly cut away to show the respective diametrical relationships of the assembly's two gaging rings; and Fig. 2 is a sectional view along line 2—2 of Fig. 1 showing the internal construction of that tandem, self-aligning unit together with a cylindrical specimen about to be inserted therein.

Requirements of external dimension gages

The manufacture of numerous types of cylindrical and other similar objects requires a close and accurate check on the object's diametrical dimensions for acceptance within minimum and maximum dimensional limits. Such measurements are usually made by employing in succession two separate gages commonly characterized "go" and "no go." These terms will hereinafter be used in this specification.

The "go" gage typically takes the form of a ring having an internal diameter equal to that of a desired maximum dimensional tolerance; the "no go" gage typically has a similar ring-like shape but is of smaller internal diameter equal to that of a desired minimum dimensional limitation. By means of such gaging elements, cylinders and other specimens having over or undersized diameters can be readily rejected.

Failure of the specimen to gain entrance into the "go" gage indicates that the specimen is too large. Penetration into the "go" gage shows the specimen not to be oversized, and attempted introduction into the "no go" gage then is in order. Failure to gain admittance into the "no go" gage shows the specimen's external dimension not to be undersized; and, conversely, passage therethrough shows a dimension below the acceptable minimum limit.

Our improved construction

Illustrated in Figs. 1 and 2 is a unit which incorporates one preferred form of the improvements of our invention. That unit utilizes the unique tandem construction wherein the "no go" gaging element 11 is placed behind or below the "go" gaging element 10 in a common or unitary frame 12 by which both of these elements are supported.

This frame 12 may take the form of a cylinder or block of any suitably rigid material such as metal or plastic. Extending centrally into this frame 12 is a circular cavity defined by the frame's inner walls 13. The axial depth of this cavity is sufficient to accommodate both the "go" element 10 and the "no go" element 11 in the tandem relationship which Fig. 2 shows.

The "no go" element 11 has an overall diameter only slightly less than that of frame 12's central opening 13. This element is first inserted into that central opening in close fitting relationship therewith as shown in Fig. 2. The represented positioning of "no go" element 11 in frame 12's lower portion is aided by extensions 14 of the frame material inwardly below that element. By these extensions element 11 is axially held in the desired position indicated.

The "go" element 10 is next placed in the frame's central opening 13 upon the "no go" element 11 so that the base or rearward end of the former rests upon or is positioned in close contact with the top or forward end of the latter. The overall depth of the two gage elements having this tandem relationship within the frame's central opening 13 is such that the opening is not quite filled to its top as shown in Fig. 2.

A retaining plate 18 is secured to frame 12 by two or more screws 19 and this plate serves to hold the gage elements 10—11 within the frame's main central opening 13. This plate also has a central opening 20 whose diameter is larger than the interior of "go" element 10, but smaller than the main openings 13 in frame 12.

The "go" gaging element 10 has an outside diameter which is appreciably smaller than that of the adjacent "no go" element 11 and that of the frame's central opening 13. This leaves around element 10's outer wall a space of the character which Fig. 2 illustratively shows. Such a space permits the "go" element 10 to have a small amount of lateral motion.

As Fig. 2 shows, both ends of the openings which extend through each of the two gage rings 10—11 are chamfered to facilitate entrance of the specimens therein. The chamfered mouths of the opening in the "no go" element 11 each have a diameter represented to be slightly larger than the diameter of "go" ring 10's chamfered mouths. This factor, together with the free moving "go" element construction just outlined, enables the self-aligning features of our invention to operate in a manner later to be described.

The sizes of the openings which extend through each of the two gage elements 10—11 will, of course, depend on the diametrical tolerances permitted for the specimens to be gaged. As previously explained, the internal diameter of the "go" element 10 will be that of the maximum overall diameter permitted for the object to be checked; the internal diameter of the "no go" element 11 will be that of the minimum overall diameter called for in the tolerance specifications of the specimens to be gaged.

*Illustrative gage operation*

Fig. 2 shows a cylindrical object 24 whose external or overall diameter is about to be gaged by means of our improved device. The tolerances permitted for this diameter in our illustrative example are a maximum of 0.8750 inch, and a minimum of 0.8125 inch. Thus the former dimension represents the internal diameter of the "go" element 10 and the smaller dimension represents the internal diameter of the "no go" element 11.

The cylindrical specimen 24 has, in our illustrative example, an overall diameter of 0.8438 inch. This specimen 24 is inserted through the opening 20 in our gaging device's retaining plate 18 and directed into the opening in the "go" element therebeneath. Entrance into the "go" ring 10 is facilitated by the chamfer (see Fig. 2) which slightly widens the diameter of each end of this element's central opening. The specimen 24, being of lesser diameter than the 0.8750 inch "go" element 10's opening, will gain entrance therein.

Continued downward pressure furnished the specimen 24 enables it to be lined up immediately over the central opening through the adjacent "no go" gaging element 11. This self-alignment is effected by contact of the specimen 24 with the chamfered edge of the opening in the "no go" ring.

The specially widened entrance into this opening, having a 0.9375 inch diameter in our illustrative example, is larger than the 0.8750 inch maximum diameter of any specimen which can pass through the "go" ring 10. The specimen 24 is thus readily admitted into the mouth of the "no go" opening. To further penetrate within the "no go" ring the specimen's diameter must, of course, be less than the internal diameter of the opening which extends through this element.

The free or "floating" movement of the "go" ring 10 permits the specimen to center itself in the "no go" ring 11's central opening, but is sufficiently restricted by the limited clearance 13 to prevent cocking of the specimen 24, and also to prevent excessive misalignment between that specimen and the "no go" element's opening therebeneath.

This cocking effect will frequently occur when attempts are made to insert an object such as the specimen 24 into immovable fixtures having close fitting openings such as in elements 10 or 11. The result is to give the operator the false impression that the specimen is oversize should cocking prevent entry into the first or "maximum size" gage, or to erroneously cause the operator to approve a specimen which enters the "go" element but fails to enter the "no go" element.

Once the specimen 24 gains entrance into the "go" element 10's opening and is lined up over the "no go" element 11, failure to enter into element 11's opening indicates the specimen's diameter to be within allowable limits. Should the specimen 24 gain admittance into "no go" element 11, the operator will reject such specimen as being undersized. Since our illustrative specimen 24's assumed overall diameter of 0.8438 inch is larger than the 0.8125 inch "no go" gage 11's opening, that specimen will not be admitted therein, and hence will be accepted by the inspector making the test.

*Advantages over prior constructions*

Gages of the general "go" and "no go" type previously described have long been used to make careful checks on overall diameters of cylindrical and other specimens within close tolerances. Our invention offers definite advantages over all prior art constructions and furthermore, simplifies the method of gaging.

One extensively used construction heretofore employed entails the mounting of "go" and "no go" gage rings side by side in a holder consisting of a bar or block of metal or similar rigid material. Narrow slits extend from the openings into which each gage is placed to the border of the holder, said slits being perpendicular to the plane surface of the gage rings. The slits permit such slight expansion of the holder as is necessary to allow the gage rings to be pressed into their accommodating openings. There the gage rings are made fast by tightening clamp screws in threaded holes which pass through the ends of the holder and through the respective slits. Tightening of the screws reduces the diameter of the opening which receives the gage rings, and thereby securely clamps each of the rings in the holder.

In using a prior art gaging unit of the "lateral" type just described, the operator first places the test specimen in the "go" ring. If the specimen enters this ring's opening the operator then attempts to insert the specimen in the "no go" ring. Two distinct inserting operations thus are required. Our improved tandem type gaging unit requires only one such insertion and thus reduces the necessary gaging operations to substantially one half of former requirements.

By actual test, in checking the diameters of the heads of caliber .30 brass cartridge cases, use of our improved gage resulted in a 20% saving in time over the lateral type, "two-step" gage under discussion. Gage rings used in these tests had tolerances of 0.4732 inch for the "go" element and 0.4660 inch for the "no go" element.

In addition, a troublesome fault of the old "lateral" type construction—cocking of the test specimen while attempting to fit it into the "no go" ring—is avoided by our improved construction. Because the opening of the "no go" element is of smaller diameter than the acceptable test specimens, the gage operator soon becomes accustomed to having the specimens fail to enter therein. Quite often, accordingly, the operator will try to fit an undersized specimen into the "no go" ring and same will become cocked or strike the edge of this ring. This will lead the operator to erroneously think the test specimen could not enter the gage and therefore must be acceptable. As earlier brought out, the possibility of such erroneous acceptance of undersized test specimens is avoided by our improved tandem gaging unit. The self-aligning feature which we have incorporated into our unit makes it practically impossible to cock a cylinder being tested with our gage. Once an undersized specimen is introduced into "go" element 10 its subsequent entrance into the "no go" element and corresponding rejection is practically assured.

An accuracy test was conducted on a quantity of caliber .30 brass cartridge cases to compare the efficiency of the old type gage with that of our invention. Our improved construction was able to detect every reject in the lot. The old "lateral," two-step type of gage, however, failed to detect several of these same rejected cases. As gage ring dimensions were identical in both instances, the superior performance must be accredited to the "self-aligning" features of our improved construction.

Another shortcoming of the old type "lateral" assembly of the two gage rings is identified with their mounting in the gage holder. Tightening of the screws that clamp the gage rings in place frequently causes a deformity in ring diameter as much as 0.0001 inch by actual measurement. This possibility of deformity requires careful rechecking of the gage rings after installation in the holder. Such time-consuming recheck is obviated by our unique tandem construction wherein the gage rings 10 and 11 are not subjected to deforming strain of any kind.

A still further type of prior art gaging device has also been utilized to measure overall diameters of specimens. It consists of a block of steel in one end of which a first opening has been machined to the size of a specimen's maximum permissible diameter, and in the other end of which a second opening has been machined to the size of the same specimen's minimum permissible diameter. These two openings are concentric and they meet within the block.

This "rigid" type of tandem construction avoids the extra "specimen inserting" operation and time consumption required by the "lateral" type of gage unit previously discussed. However, the greater inaccuracy caused by the rigid relationship of the two gaging diameters has precluded rigid tandem gage use in favor of the slower "lateral" gaging method. One major source of error lies in the failure of the "go" diameter portion of the gage block to have freedom of movement needed to overcome the oft-recurring cocking action of the test specimen. Our improved "non-rigid" and self-aligning construction allows the "go" ring element 10 to have such freedom of motion as is necessary to eliminate this cocking action. Such elimination enables the "go" and "no go" rings 10 and 11 to align themselves during the testing procedure, as fully explained hereinbefore.

Moreover, the machining of the two different sized gage openings concentrically in a single block of steel is a most difficult task requiring very great skill and a considerable amount of time. Compared to the task of machining two separate gage rings each with one opening having a single internal diameter as required by our invention, the precision machining operation required to obtain the two different sized concentric aperatures in the one bock is a much longer and expensive operation. An important additional advantage which our new improvements have over this rigid type of tandem gage construction is one of economy. Because the "go" ring element is exposed to greater wear than the "no go" element, the former needs to be replaced far more often than the latter. For example, in gaging heads of caliber .30 cartridge cases, users have reported that an average of ten "go" gage rings wear out before one "no go" gage ring becomes unuseable. Thus, it can be readily seen that the use of a tandem gage constructed out of a single block of steel is uneconomical. Each time it becomes necessary to replace the worn "go" portion of the gage block, the perfectly good "no go" portion of the same block will have to be discarded too. This waste is avoided by our construction which permits of separate replacement of the gage rings 10 and 11 as such becomes necessary.

Summary

Although the improvements of our invention have been described, in one instance, as being used to gage the overall diameters of caliber .30 cartridge cases, it will be readily apparent that such description is by way of illustration rather than restriction. Such diametrical measurements may be similarly gaged on cylindrical or other specimens of almost any dimensions which may be handled conveniently.

It will thus be seen that by our invention we have improved the performance and simplified the operation of gages useful in checking the external diameter of cylindrical and other specimens; that we have reduced the number of operations heretofore considered most practical for gaging the overall dimensions of such specimens; that we have provided improved means for positive selection of specimens which are within external dimensional limits; that we have reduced the time required to check external dimensions of specimens over gaging methods previously used; that we have obviated all need for rechecking of gage ring precision after assembly into the gage holder; and that we have improved the economy of gage operation and increased the life of the gage ring elements.

Our inventive improvements are therefore extensive in their adaptation and are not to be restricted to the specific form here disclosed by way of illustration.

We claim:

1. In a device for checking the external diameter of cylindrical and other objects, the combination of a first or "go" gaging element having an internal diameter equal to a desired maximum dimension for the objects to be checked; a second or "no go" gaging element having an internal diameter equal to a desired minimum dimension for said objects, and means in the form of a unitary frame for supporting said first and second elements in abutting tandem and substantially co-axial relation with the second or "no go" element held in said frame and with the first or "go" element movably positioned therein so as to be free for limited lateral shifting with respect to said second element against which it abuts as aforesaid.

2. In a device for checking the external diameter of cylindrical and other objects, the combination of a first or "go" gaging element having an internal diameter equal to a desired maximum dimension for the objects to be checked, a second or "no go" gaging element having an internal diameter equal to a desired minimum dimension for said objects, a unitary frame surrounding both of said elements and supporting same in abutting tandem and substantially co-axial relation and permitting axial insertion of said objects into and through the first or "go" element and thence into the second or "no go" element adjacent thereto, means including said frame for holding said second element therein, and means also including said frame for movably positioning said first element therein in a way which permits limited freedom for lateral shifting with respect to said second element.

3. In a device for checking the external diameter of cylindrical and other objects, the combination of a frame-like holder formed of rigid material and having a central cavity extending therein from the holder's forward end almost to the holder's rear, a "no go" gage ring having an internal diameter equal to a desired minimum dimension for the objects to be checked and being held in the extreme rear portion of said cavity, a "go" gage ring having an internal diameter equal to a desired maximum dimension for said objects and being movably positioned in the forward portion of said cavity in co-axial tandem relation to said "no go" ring and there free for limited lateral shifting with respect to the "no go" ring, and a cover plate having a central opening larger than that of said "go" ring but smaller than the diameter of said cavity attached to said holder's forward end and there serving to retain said "go" and "no go" rings in said cavity.

THEODORE A. ANDERER.
ROBERT W. TAFEL.